(12) United States Patent
Bier et al.

(10) Patent No.: US 6,361,868 B1
(45) Date of Patent: Mar. 26, 2002

(54) COATING COMPOUNDS BASED ON SILANES CONTAINING EPOXIDE GROUPS

(75) Inventors: Peter Bier, Krefeld (DE); Herbert Krug, Harrison City, PA (US); Stefan Sepeur, Wadgassen-Schaffhausen (DE); Sabine Stein, Nenzing (AT)

(73) Assignees: Bayer Aktiengesellschaft, Leverkusen; Institut fur Neue Materilien gem GmbH, Saarbruecken, both of (DE)

( * ) Notice: Subject to any disclaimer, the term of this patent is extended or adjusted under 35 U.S.C. 154(b) by 0 days.

(21) Appl. No.: 09/486,503
(22) PCT Filed: Aug. 17, 1998
(86) PCT No.: PCT/EP98/05198
§ 371 Date: Apr. 3, 2000
§ 102(e) Date: Apr. 3, 2000
(87) PCT Pub. No.: WO99/11725
PCT Pub. Date: Mar. 11, 1999

(30) Foreign Application Priority Data

Aug. 28, 1997 (DE) .......................................... 197 37 475

(51) Int. Cl.$^7$ ................................................. B32B 17/06
(52) U.S. Cl. ........................ 428/428; 428/328; 428/415; 428/447; 524/430; 524/437; 524/441; 528/10
(58) Field of Search ................................. 529/430, 405, 529/437, 265, 441; 528/10; 428/415, 428, 447, 328

(56) References Cited

U.S. PATENT DOCUMENTS

| 4,338,375 A | 7/1982 | Hashimoto et al. .......... 428/412 |
| 5,134,191 A | 7/1992 | Takarada et al. ............. 524/783 |
| 6,008,285 A | 12/1999 | Kasemann et al. .......... 524/430 |

FOREIGN PATENT DOCUMENTS

| DE | 40 20 316 | 1/1992 |

*Primary Examiner*—Blaine Copenheaver
*Assistant Examiner*—Christopher Paulraj
(74) *Attorney, Agent, or Firm*—Joseph C. Gil; Thomas W. Roy

(57) ABSTRACT

The present invention provides a coating composition which comprises at least one silicon compound (A) which has at least one radical which is bonded directly to Si, is not able to be separated hydrolytically and contains an epoxy group, a particulate material (B) which is selected from among oxides, oxide hydrates, nitrides and carbides of Si, Al and B and of transition metals and has a particle size within the range 1 to 100 nm, an Si, Ti, Zr, B, Sn or V compound (C) and at least one hydrolysable Ti, Zr or Al compound (D), which comprises the following ratio 1.0 mol of the silicon compound (A),
0.27 to 0.49 mol of the particulate material (B),
0.36 to 0.90 mol of the compound (C) and
0.14 to 0.22 mol of the compound (D).

15 Claims, No Drawings

COATING COMPOUNDS BASED ON SILANES CONTAINING EPOXIDE GROUPS

BACKGROUND OF THE INVENTION

The present invention relates to coating compositions based on epoxy group-containing hydrolysable silanes, articles coated therewith and their use.

Materials which are suitable as coatings can be prepared from alkoxides, for example aluminium propanolate or aluminium butanolate, with use of modified alkoxy silanes, using the sol-gel method. These sol-gel processes are substantially characterised in that a mixture of the starting components reacts to form a viscous liquid phase as a result of a process of hydrolysis and condensation. This synthesis procedure gives rise to an organically modified inorganic parent structure whose surface hardness is greater than that of conventional organic polymers. However, a crucial disadvantage is that the high reactivity of the aluminium-containing component is a barrier to achieving good stability in storage (pot life). The layers obtained are still relatively soft by comparison with inorganic materials. The reason is that although the inorganic constituents in the system produce a strong cross-linking effect, their very small size prevents such mechanical properties as, for example, their hardness and abrasion resistance from having an effect. So-called filled polymers offer the potential for full exploitation of the favourable mechanical properties of the inorganic constituents, because particle sizes which are present in this case are of several micrometers. Yet in this case the transparency of the materials is lost, and applications in the optical field are no longer possible. While it is possible to use small $SiO_2$ particles (for example Aerosils®) to produce transparent layers having increased abrasion resistance, the abrasion resistance values achievable at the low concentrations which can be used are similar to those of the above-mentioned system. The upper limit to the quantity of filler which can be used is dictated by the high surface reactivity of the small particles which results in agglomeration or unacceptably increased viscosity.

WO 95/13326 describes a process for the preparation of an organically modified inorganic system which has markedly greater hardness than that of the systems described above, and a high degree of optical transparency. It also describes organically modified inorganic systems suitable for protecting metal surfaces from corrosion as well as corresponding systems for hydrophilic coatings. The compositions are obtained by a process which comprises the addition, to at least one pre-hydrolysed silicon compound having an epoxy group-containing radical bonded directly to Si, of a particulate material which is selected from among oxides, oxide hydrates, nitrides and carbides of Si, Al and B or transition metals and has a particle size within the range 1 to 100 nm, preferably boehmite, and/or the addition of a preferably nonionic surfactant and/or of an aromatic polyol. A high scratch resistance is achieved by combining the pre-hydrolysed silicon compound with the particulate material. On the other hand, by combining the pre-hydrolysed silicon compound with a surfactant hydrophilic coatings are obtained, while, by combining the pre-hydrolysed silicon compound with an aromatic polyol, corrosion-inhibiting coatings can be obtained. The addition of fluorinated silanes may be chosen in the process, in order to prepare hydrophobic or oleophobic coatings, or the addition of Lewis bases or alcoholates as cross-linking catalysts, or the addition of further hydrolysable compounds.

DE-40 20 316-A1 describes a lacquer based on hydrolysable silanes which affords abrasion-resistant, flexible coatings after curing. It is obtainable by reacting with water one or more silicon compounds containing an epoxy group, wherein the molar ratio of water to hydrolysable groups which are present is from 1:1 to 0.4:1. Further hydrolysable compounds of, for example, aluminium, titanium, zirconium, vanadium. tin, lead and boron, may also be used in addition to the silicon compound. Tertiary amines which bring about cross-linking of the epoxy groups at temperatures above 60° C. are particularly suitable as catalysts for curing the composition.

DE-OS 30 21 018 discloses a coating composition which contains a partially hydrolysed condensation product of alkyl trialkoxysilanes, an organic carboxylic acid and an anionic fluorocarbon surface-active agent. The silanes used contain no epoxy groups. The composition affords surface coatings having an abrasion-resistant surface and good transparency, heat resistance and adhesion to the base material, as well as water-resistance.

U.S. Pat. No 5,134,191 discloses a hard coating composition which contains an epoxy group-containing organic silicon compound and inorganic submicron particles, such as silica sol, and is curable using a minimal amount of an antimony compound as the curing catalyst. It is usable as a coating film for plastics-material optical articles. The composition may optionally also contain an aluminium compound.

The object of the present invention is to provide a composition having scratch resistance, adhesion, lacquer viscosity and elasticity which are improved even further, and a lesser tendency towards gelation and clouding compared with the or art compositions.

SUMMARY OF THE INVENTION

This object is achieved by a coating composition comprising at least one silicon compound (A) which has at least one radical which is bonded directly to Si, is not able to be separated hydrolytically and contains an epoxy group, a particulate material (B) which is selected from among oxides, oxide hydrates, nitrides and carbides of Si, Al and B and of transition metals and has a particle size within the range 1 to 100 nm, an Si, Ti, Zr, B, Sn or V compound (C) and at least one hydrolysable Ti, Zr or Al compound (D), characterised in that it comprises the following ratio 1.0 mol of the silicon compound (A),
0.27 to 0.49 mol of the particulate material (B),
0.36 to 0.90 mol of the compound (C) and
0.14 to 0.22 mol of the compound (D)

DETAILED DESCRIPTION OF THE INVENTION

The compositions according to the invention characterised by certain quantitative ratios of the components used afford highly scratch-resistant coatings which have particularly good adhesion to the coated material and a markedly increased pot life. A Lewis base (E) may be used additionally as a catalyst in order to achieve a more hydrophilic character for the composition according to the invention.

A hydrolysable silicon compound (F) having at least one non-hydrolysable radical which has 5 to 30 fluorine atoms bonded directly to carbon atoms may additionally be used, wherein the latter carbon atoms are separated from the Si by at least 2 atoms. The use of such a fluorinated silane imparts hydrophobic and soil-repellent properties to the corresponding coating.

A preferably nonionic surfactant (G) may also be used additionally in order to achieve enduring hydrophilic properties, and/or an aromatic polyol (H) in order to tat achieve corrosion-inhibiting properties (increased resistance to condensation).

The compounds (A) to (H) are explained in greater detail below:

Silicon Compound (A)

The silicon compound (A) is a silicon compound which has available 2 or 3 hydrolysable radicals, preferably 3, and one or 2 non-hydrolysable radicals, preferably one. The single non-hydrolysable radical and, respectively, at least one of the two non-hydrolysable radicals, have available an epoxy group.

Examples of the hydrolysable radicals are halogen (F, Cl, Br and I, in particular Cl and Br), alkoxy (in particular $C_{1-4}$-alkoxy, such as, for example, methoxy, ethoxy, n-propoxy, i-propoxy and n-butoxy, i-butoxy, sec-butoxy and tert-butoxy), aryloxy (in particular $C_{6-10}$-aryloxy, for example phenoxy), acyloxy (in particular $C_{1-4}$-acyloxy, such as, for example, acetoxy and propionyloxy) and alkylcarbonyl (for example acetyl). Alkoxy groups, in particular methoxy and ethoxy, are particularly preferred hydrolysable radicals.

Examples of non-hydrolysable radicals having no epoxy group are hydrogen, alkyl, in particular $C_{1-4}$-alkyl (such as, for example, methyl, ethyl, propyl and butyl), alkenyl (in particular $C_{2-4}$-alkenyl, such as, for example, vinyl, 1-propenyl, 2-propenyl and butenyl), alkinyl (in particular $C_{2-4}$-alkinyl, such as, for example, acetylenyl and propargyl) and aryl, in particular $C_{6-10}$-aryl, such as, for example, phenyl and naphthyl), wherein the groups just named may optionally contain one or more substituents such as, for example, halogen and alkoxy. Methacryl- and methacryloxy-propyl radicals may also be mentioned in this context.

Examples of non-hydrolysable radicals having an epoxy group are in particular those having available a glycidyl or glycidyloxy group.

Concrete examples of silicon compounds (A) which are usable according to the invention may be found, for example, on pages 8 and 9 of EP-A-195493, the *disclosure of which publication is included in the present Application by reference.

Silicon compounds (A) which are particularly preferred according to the invention are those of the general formula $$R_3SiR'$$

in which the radicals R are the same or different (preferably identical) and stand for a hydrolysable group (preferably $C_{1-4}$-alkoxy and in particular methoxy and ethoxy), and R' represents a glycidyl- or glycidyloxy-($C_{1-20}$)-alkylene radical, in particular β-glycidyloxyethyl-, γ-glycidyloxypropyl, δ-glycidyloxybutyl-, ε-glycidyloxypentyl-, ω-glycidyloxyhexyl- and 2-(3,4-epoxycyclohexyl)-ethyl-.

γ-Glycidyloxypropyl trimethoxysilane (hereinbelow abbreviated to GPTS) is particularly preferably used according to the invention because it is readily accessible.

Particulate Material (B)

The particulate material (B) is an oxide, oxide hydrate, nitride or carbide of Si, Al and B and of transition metals, preferably Ti, Zr and Ce, having a particle size within the range 1 to 100 nm, preferably 2 to 50 nm and particularly preferably 5 to 20 nm. This material may be used in the form of a powder, while however preferably being used in the form of a (in particular acid-stabilised) sol. Preferred particulate materials are boehmite. $CeO_2$, $ZrO_2$ and $TiO_2$ and titanium nitride. Nano-sized boehmite particles are particu- larly preferred. The particulate materials are obtainable commercially in the form of powders, and the preparation of (acid-stabilised) sols therefrom is likewise known in the prior art. For this purpose reference may furthermore be made to the preparation Examples provided below. The principle of stabilising nanoscale titanium nitride by means of guanidinopropionic acid is described, for example, in German Patent Application P-43 34 639.1.

Boehmite sol having a pH within the range 2.5 to 3.5, preferably 2.8 to 3.2, is particularly preferably used, and can be obtained, for example, by suspending boehmite powder in dilute HCl.

Variation of the nanoscale particles is generally associated with a variation in the refractive index of the corresponding materials. Thus, for example, the replacement of boehmite particles with $ZrO_2$ or $TiO_2$ particles leads to materials having higher refractive indices, wherein the refractive index results additively from the volume of the high-refracting component and the matrix, in accordance with the Lorentz-Lorenz equation.

Hydrolysable Compounds (C)

In addition to the silicon compounds (A), use is also made of other hydrolysable compounds of elements from the group consisting of Si, Ti, Zr, Al, B, Sn and V, which are preferably hydrolysed with the silicon compound(s) (A) in order to prepare the compositions according to the invention.

The compound (C) is an Si, Ti, Zr, B, Sn and V compound of the general formula $$R_xM^{4+}R'_{4-x}$$

or $$R_xM^{3+}R'_{3-x}$$

wherein M represents a) $Si^{4+}$, $Ti^{4+}$, $Zr^{4+}$, $Sn^{4+}$, or b) $Al^{3+}$, $B^{3+}$ or $(VO)^{3+}$, R represents a hydrolysable radical, R' represents a non-hydrolysable radical, and x can be from 1 to 4 in the case of quadrivalent metal atoms M (case a)) and from 1 to 3 in the case of trivalent metal atoms M (case b)). If a plurality of radicals R and/or R' are present in a compound (C), these may in each case be the same or different. Preferably x is greater than 1. That is to say the compound (C) has at least one hydrolysable radical, preferably a plurality thereof.

Examples of the hydrolysable radicals are halogen (F, Cl, Br and I, in particular Cl and Br), alkoxy (in particular $C_{1-4}$-alkoxy, such as, for example, methoxy, ethoxy, n-propoxy, i-propoxy and n-butoxy, i-butoxy, sec-butoxy or tert-butoxy), aryloxy (in particular $C_{6-10}$-aryloxy, for example phenoxy), acyloxy (in particular $C_{1-4}$-acyloxy, such as, for example, acetoxy and propionyloxy) and alkylcarbonyl (for example acetyl). Alkoxy groups, in particular methoxy and ethoxy, are particularly preferred hydrolysable radicals.

Examples of non-hydrolysable radicals are hydrogen, alkyl, in particular $C_{1-4}$-alkyl (such as, for example, methyl, ethyl, propyl and n-butyl, i-butyl, sec-butyl and tert-butyl), alkenyl (in particular $C_{2-4}$-alkenyl, such as, for example, vinyl, 1-propenyl, 2-propenyl and butenyl), alkinyl (in particular $C_{2-4}$-alkinyl, such as, for example, acetylenyl and propargyl) and aryl, in particular $C_{6-10}$-aryl, such as, for example, phenyl and naphthyl), wherein the groups just named may optionally contain one or more substituents such as, for example, halogen and alkoxy. Methacryl- and methacryloxy-propyl radicals may also be mentioned in this context.

Concrete examples of the compounds (C) which may be used are given below, wherein these should not, however, represent any restriction of the compounds (C) which are usable.

$Si(OCH_3)_4$, $Si(OC_2H_5)_4$, $Si(O-n-$ or $i-C_3H_7)_4$,
$Si(OC_4H_9)_4$, $SiCl_4$, $HSiCl_3$, $Si(OOCCH_3)_4$,
$CH_3$—$SiCl_3$, $CH_3$—$Si(OC_2H_5)_3$, $C_2H_5$—$SiCl_3$, $C_2H_5$—$Si(OC_2H_5)_3$,
$C_3H_7$—$Si(OCH_3)_3$, $C_6H_5$—$Si(OCH_3)_3$, $C_6H_5$—$Si(OC_2H_5)_3$,
$(CH_3O)_3$—$Si$—$C_3H_6$—$Cl$,
$(CH_3)_2SiCl_2$, $(CH_3)_2Si(OCH_3)_2$, $(CH_3)_2Si(OC_2H_5)_2$,
$(CH_3)_2Si(OH)_2$, $(C_6H_5)_2SiCl_2$, $(C_6H_5)_2Si(OCH_3)_2$,
$(C_6H_5)_2Si(OC_2H_5)_2$, $(i-C_3H_7)_3SiOH$,
$CH_2$=$CH$—$Si(OOCCH_3)_3$,
$CH_2$=$CH$—$SiCl_3$, $CH_2$=$CH$—$Si(OCH_3)_3$, $CH_2$=$CH$—$Si(OC_2H_5)_3$,
$CH_2$=$CH$—$Si(OC_2H_4OCH_3)_3$, $CH_2$=$CH$—$CH_2$—$Si(OCH_3)_3$,
$CH_2$=$CH$—$CH_2$—$Si(OC_2H_5)_3$,
$CH_2$=$CH$—$CH_2$—$Si(OOCCH_3)_3$,
$CH_2$=$C(CH_3)$—$COO$—$C_3H_7$—$Si(OCH_3)_3$,
$CH_2$=$C(CH_3)$—$COO$—$C_3H_7$—$Si(OC_2H_5)_3$,
$Al(OCH_3)_3$, $Al(OC_2H_5)_3$, $Al(O-n-C_3H_7)_3$,
$Al(O-i-C_3H_7)_3$, $Al(OC_4H_9)_3$, $Al(O-i-C_4H_9)_3$,
$Al(O-sec-C_4H_9)_3$, $AlCl_3$, $AlCl(OH)_2$, $Al(OC_2H_4OC_4H_9)_3$,
$TiCl_4$, $Ti(OC_2H_5)4$, $Ti(OC_3H_7)_4$,
$Ti(O-i-C_3H_7)_4$, $Ti(OC_4H_9)_4$, $Ti(2$-ethylhexoxy$)_4$;
$ZrCl_4$, $Zr(OC_2H_5)_4$, $Zr(OC_3H_7)_4$, $Zr(O-i-C_3H_7)_4$, $Zr(OC_4H_9)_4$,
$ZrOCl_2$, $Zr(2$-ethylhexoxy$)_4$, and Zr compounds which have complexing radicals such as, for example, β-diketone radicals and methacrylic radicals,
$BCl_3$, $B(OCH_3)_3$, $B(OC_2H_5)_3$,
$SnCl_4$, $Sn(OCH_3)_4$,
$Sn(OC_2H_5)_4$,
$VOCl_3$, $VO(OCH_3)_3$, $SiR_4$ compounds are particularly preferably used, wherein the radicals R may be the same or different, and stand for a hydrolysable group, preferably an alkoxy group having 1 to 4 carbon atoms, in particular methoxy, ethoxy, n-propoxy, i-propoxy, n-butoxy, i-butoxy, sec-butoxy or tert-butoxy.

As may be seen, these compounds (C) (in particular the silicon compounds) also have available non-hydrolysable radicals which have a C—C double or triple bond. If such compounds are used together with (or even in place of) the silicon compounds (A), monomers (preferably containing epoxy or hydroxyl groups) such as, for example, meth (acrylates), can also be incorporated additionally in the composition (these monomers may of course also have available two or more functional groups of the same type, such as, for example, poly(meth)acrylates of organic polyols; the use of organic polyepoxides is equally possible). When curing of the corresponding composition is then induced in a thermal or photochemical manner, there takes place, in addition to the construction of the organically modified inorganic matrix, a polymerisation of the organic species, resulting in an increased cross-linking density of the corresponding coatings and moulded bodies, and consequently also in increased hardness.

Compound (D)

The compound (D) is preferably a Ti, Zr or Al compound of the following general formula

in which M stands for Ti, Zr or Al, and the radicals R''' may be the same or different, and stand for a hydrolysable group, and n is 4 (M=Ti, Zr) or 3 (M=Al).

Examples of the hydrolysable groups are halogen (F, Cl, Br and I, in particular Cl and Br), alkoxy (in particular $C_{1-6}$-alkoxy, such as, for example, methoxy, ethoxy, n-propoxy, i-propoxy and n-butoxy, i-butoxy, sec-butoxy or tert-butoxy, n-pentyloxy, n-hexyloxy), aryloxy (in particular $C_{6-10}$-aryloxy, for example phenoxy), acyloxy (in particular $C_{1-4}$-acyloxy such as, for example, acetoxy and propionyloxy) and alkylcarbonyl (for example acetyl), or a $C_{1-6}$-alkoxy-$C_{2-3}$-alkyl group, that is to say a group derived from $C_{1-6}$-alkylethylene glycol or -propylene glycol, wherein alkoxy denotes the same as is mentioned hereinabove.

Particularly preferably, M is aluminium, and R''' is ethanolate, sec-butanolate. n-propanolate or n-butoxyethanolate.

Lewis Base (E)

The Lewis base (E) is preferably a nitrogen compound. Such nitrogen compounds may be selected, for example, from among N-heterocycles, amino group-containing phenols, polycyclic amines and ammonia (preferably as an aqueous solution). Concrete examples of these are 1-methylimidazole, 2-(N,N-dimethylaminomethyl) phenol, 2,4,6-tris(N, N-dimethylaminomethyl) phenol and 1,8-diazabicyclo[5.4.0]-7-undecene. Of these compounds 1-methylimidazole is particularly preferred.

A further class of nitrogen-containing Lewis bases which may be used according to the invention are hydrolysable silanes which have available at least one non-hydrolysable radical which comprises at least one primary, secondary or tertiary amino group. Such silanes may be hydrolysed together with the silicon compound (A), and then represent a Lewis base incorporated into the organically modified inorganic network. Preferred nitrogen-containing silicon compounds are those of the general formula

in which the radicals R are the same or different (preferably identical) and stand for a hydrolysable group (preferably $C_{1-4}$-alkoxy and in particular methoxy and ethoxy), and R'' stands for a non-hydrolysable radical bonded to Si, which comprises at least one primary, secondary or tertiary amino group. Concrete examples of such silanes are 3-aminopropyl trimethoxysilane, 3-aminopropyl triethoxysilane, N-(2-aminoethyl)-3-aminopropyl trimethoxysilane, N-[N'-(2'-aminoethyl)-2-aminoethyl]-3-aminopropyl trimethoxysilane and N-[3-(triethoxysilyl)propyl]-4,5-dihydroimidazole.

The Lewis base is generally used in the corresponding compositions in a quantity of from 0.01 to 0.5 mole per mole of epoxy group of the silicon compound (A). Quantities are preferably within the range 0.02 to 0.3 and in particular 0.05 to 0.1 mole of the Lewis base per mole of epoxy group.

Fluorine-containing Silicon Compound (F)

The hydrolysable fluorinated silanes (F) which may additionally be used are those having available at least one non-hydrolysable radical which has 5 to 30 fluorine atoms bonded to carbon atoms which are separated from the Si by at least two atoms. Such silanes are described in detail in DE-OS 41 18 184. The following are concrete examples:

$C_2F_5CH_2$—$CH_2$—$SiY_3$
$n-C_6F_{13}CH_2CH_2$—$SiY_3$
$n-C_8F_{17}CH_2CH_2$—$SiY_3$
$n-C_{10}F_{21}CH_2CH_2$—$SiY_3$
(Y=$OCH_3$, $OC_2H_5$ or Cl)
$i-C_3F_7O$—$(CH_2)_3$—$SiCl_2(CH_3)$
$n-C_6F_{13}CH_2CH_2SiCl_2(CH_3)$
$n-C_6F_{13}CH_2CH_2SiCl(CH_3)_2$

These fluorinated silanes are generally used in a quantity of 0.1 to 15 wt. %, preferably 0.2 to 10 wt. %, and particularly preferably 0.5 to 5 wt. %, in relation to the composition.

Surfactant (G)

The surfactant (G) which may be used in order to achieve an enduring anti-clouding effect and an increased hydrophilic character of the coatings is preferably a nonionic surfactant. Nonionic surfactants which are present in liquid form at room temperature are particularly preferred. Not only is it possible to use these surfactants while the compositions are being prepared by the process according to the invention, but they may also (preferably in aqueous solution) be incorporated subsequently by thermal diffusion at approximately 50 to 60° C. Preferred surfactants are polyoxyethylene oleyl ethers of different chain lengths (for example Brij® 92, 96 or 98 from ICI), polyoxyethylene cetyl ethers of different chain lengths (for example Malipal® 24/30 to 24/100 from Hüls and Disponil® 05 from Henkel), sodium lauryl sulphate (for example Sulfopon® 101 Spezial from Henkel), lauryl pyridinium chloride (for example Dehydquad C Christ® from Henkel) and polyoxyethylene sorbitan monooleate (for example Tween® from Riedel de Haen).

The surfactant is generally used in quantities of from 0.1 to 35 wt. %, in relation to the coating composition.

Aromatic Polyol (H)

The aromatic polyol used according to the invention has a maximum average molecular weight of 1000. Examples of such polyols are, for example, polyphenylene ethers which carry hydroxy groups on at least 2 of the phenyl rings, and oligomers in which aromatic rings are bonded to one another by a single bond, —O—, —CO—, —SO$_2$— or similar, and have at least (and preferably) 2 hydroxy groups bonded to aromatic groups.

Aromatic polyols which are particularly preferred are aromatic diols. Compounds having the following general formulae are particularly preferred representatives of the latter:

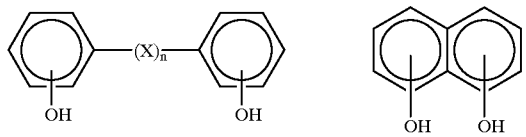

wherein X stands for a ($C_1$–$C_8$)-alkylene or -alkylidene radical, a ($C_6$–$C_{14}$)-arylene radical. —O—, —S—, —CO— or —SO$_2$—, and n is 0 or 1. X is preferably $C_1$–$C_4$-alkylene or -alkylidene, in particular —C(CH$_3$)$_2$—, and —SO$_2$—. The aromatic rings of the compounds may additionally carry as well as the OH groups up to 3 or 4 further substituents such as, for example, halogen, alkyl and alkoxy.

Concrete examples of aromatic polyols (H) which are usable according to the invention are bisphenol A, bisphenol S and 1,5-dihydroxynaphthalene, with bisphenol A preferred.

The polyol (H) is generally used in quantities such that per mol of epoxy ring of the silicon compound (A) there are present from 0.2 to 1.5 mol, preferably from 0.3 to 1.2 mol. and particularly preferably from 0.6 to 1.0 mol of hydroxy groups of the aromatic polyol (H).

The use, in the compositions according to the invention, of silicon compounds (A) which have available at least two epoxy groups leads to coatings and moulded bodies having improved stability when exposed to condensation.

The compositions according to the invention are preferably obtained by a process described in greater detail hereinbelow, in which a sol of the material (B) having a pH within the range 2.5 to 3.5, preferably 2.8 to 3.2, is reacted with a mixture of the other components.

Still more preferably they are prepared by a process which is also defined in greater detail hereinbelow, in which the sot as defined hereinabove is added in two part portions to the mixture of (A) and (C), wherein certain temperatures are preferably observed, and wherein the addition of (D) takes place between the two portions of (B), likewise preferably at a certain temperature.

It is crucial for the composition according to the invention that the quantities of the components used should fall within the defined ranges. It has emerged that under this precondition compositions which have markedly improved scratch resistance, adhesion, lacquer viscosity, gelation times, clouding and elasticity can be obtained.

The hydrolysable silicon compound (A) may be pre-hydrolysed optionally together with the compound (C) with the use of an acid catalyst (preferably at room temperature) in aqueous solution, wherein preferably approximately ½ mole of water is used per mole of hydrolysable group. Hydrochloric acid is preferably used as the catalyst for the pre-hydrolysis.

The particulate material (B) is preferably suspended in water and the pH adjusted to 2.5 to 3, preferably 2.8 to 3.2. Hydrochloric acid is preferably used for acidification. If boehmite is used as the particulate material (B), a clear sol is formed under these conditions.

The compound (C) is mixed with the compound (A). The first part portion of the suspended particulate material (B) as described hereinabove is then added. The quantity is preferably selected such that the water contained therein is sufficient for the semi-stoichiometric hydrolysis of the compounds (A) and (C). This quantity is from 10 to 70 wt. % of the total quantity, preferably from 20 to 50 wt. %.

A few minutes after the addition the temperature of the sol rises to approximately 28 to 30° C., and the sot is clear after approximately 20 minutes. The mixture is then stirred for approximately 0.5 to 3 hours, preferably 1 to 2 hours. The batch temperature is then lowered to approximately 0° C. The compound (D) is then added, wherein a temperature of approximately 3° C. should not be exceeded. The sol is stirred at approximately 0° C. for a further 0.5 to 3 hours, preferably 1 to 2 hours, after the addition of the compound (D) is complete. The remainder of the particulate material (B) is then added, wherein the temperature should not exceed 5° C. The reactor temperature is then adjusted to 20° C. in order to bring the composition to room temperature. The composition is stored at approximately 4° C. in a refrigerator.

The compound (D) and optionally the Lewis base (E) is/are preferably added slowly after the addition of the first part portion of the material (B), likewise at approximately 0° C.

Room temperature is understood to be a temperature of 20 to 23° C.

In order to adjust the Theological properties of the compositions, inert solvents may optionally be added at any stage of the preparation. These solvents are preferably alcohols which are liquid at room temperature and which furthermore arise from the hydrolysis of the alkoxides which are preferably used. Alcohols which are particularly preferred are $C_{1-8}$ alcohols, in particular methanol, ethanol, n-propanol, i-propanol, n butanol, i-butanol, tert-butanol, n-pentanol, i-pentanol, n-hexanol, n-octanol and n butoxyethanol. $C_{1-6}$-glycol ethers, in particular n-butoxyethanol, are likewise preferred.

The compositions according to the invention may furthermore contain conventional additives such as, for example, colorants, flow promoters. UV stabilisers, photoinitiators, photosensitisers (where photochemical curing of the composition is intended) and thermal polymerisation catalysts.

Application to the substrate is by standard coating methods such as, for example, dipping, painting, brushing, knife application, rolling, spraying, curtain-coating, spin-coating and centrifugal coating.

Optionally after first becoming surface dry at room temperature, the coated substrate is cured. Curing takes place preferably in thermal manner at temperatures within the range 50 to 300° C., in particular 70 to 200° C., and particularly preferably 90 to 180° C., optionally at reduced pressure. The hardening time under these conditions should be less than 200 minutes, preferably less than 100 minutes, and even more preferably less than 60 minutes. The layer thickness of the cured layer should be 0.5 to 100 μm, preferably 1 to 20 μm and in particular 2 to 10 μm.

If unsaturated compounds and photoinitiators are present curing may also take place by irradiation, followed optionally by thermal post-curing.

The choice of substrate materials for coating is unlimited. The compositions according to the invention are preferably suitable for coating wood, textiles, paper, stoneware, metals, glass, ceramics and plastics materials, and of the latter particularly for coating thermoplastics such as are described in Becker/Braun, Kunststofftaschenbuch [Handbook of Plastics], Carl Hanser Verlag, Munich, Vienna 1992. The compositions are quite particularly suitable for coating transparent thermoplastics, and preferably polycarbonates, or for coating metals or metallised surfaces. In particular spectacle glasses, optical lenses, automotive windows and thermal heads may be coated with the compositions obtained according to the invention.

The Examples which follow further explain the present invention:

EXAMPLES 129.04 g of Disperal Sol P3® were added, with stirring, to 1290.40 g 0.1N HCl, and the pH was adjusted to 3 with concentrated HCl. Stirring then took place for 14 hours at room temperature, and the pH was then checked again. Separately, 1181.7 g (5 mol) of GPTS and 625.0 g (3 mol) of TEOS (tetraethoxysilane) were mixed and stirred for 10 minutes. A metering pump dispensed 267.3 g of the boehmite sol into this mixture at a flow rate of 20 g/min. A few minutes after the addition the temperature of the sol rose to approximately 28 to 30° C., and the sol was clear after approximately 20 minutes. The mixture was then stirred at room temperature for approximately 2 hours, and the temperature was then lowered to approximately 0° C. At 0° C.±2° C. the addition then took place of 378.54 g (1 mol) of Al(OEtOBu)$_3$ at a dispensing rate of approximately 3 ml/min. After the addition had been terminated stirring continued for a further 2 hours at approximately 0° C., and the remaining boehmite sol was then added, likewise at approximately 0° C. and at a dispensing rate of approximately 13 ml/min. The temperature of the reaction mixture obtained then rose to room temperature, without temperature control. Byk 306® was added as a flow promoter, and the lacquer obtained was stored at +4° C.

Further Examples and Comparative Examples were carried out in accordance with this process, wherein the quantities of the components were modified in accordance with the values shown in Table 1.

Test pieces were obtained as follows using the lacquers obtained: bisphenol A-based polycarbonate (glass transition temperature=147° C., $M_W$ 27500) plates measuring 105× 150×4 mm were cleaned with isopropanol and primed by dipping in a mixture prepared from 3 wt. % aminopropyl trimethoxysilane and 97 wt. % butyl glycol, followed by 0.5 hour of heat treatment at 130° C. The plates were then coated with a 20 μm lacquer layer in each case at a dipping rate of V=100 cm/min. After cooling for 10 minutes at room temperature the coated plates were dried at 130° C. for 1 hour. The layer thickness of the lacquers after drying was approximately 7 μm. The coated plates were stored at room temperature for 2 days after hardening, and then underwent the tests defined below.

The properties of the coatings obtained with these lacquers were determined as follows:

cross-hatch (gt) adhesion test: EN ISO 2409:1994 cross-hatch adhesion test following storage in water: 65° C., tt (tape test)=0/1. The lacquered plates are cross-hatched to EN ISO 2409:1994 and are stored in water held at 65° C. The result recorded is the storage time (in days) after which the first loss of adhesion of 0 to 1 takes place in the tape test.

sand trickling test: DIN 52 348

Taber abrader test: wear test DIN 52 347; (1000 cycles, CS10F, 500 g)

The evaluation results are shown in the following Table:

TABLE 1

|  | GPTS (mol) | TEOS (mol) | Boehmite (mol) | Al(OEtOBu)$_3$ (mol) | Taber abrader test Δ Haze (%) | Sand trickling test Δ Haze (%) | Cross-hatch adhesion test (gt/tt) | Cross-hatch adhesion test after storage in water (days) |
|---|---|---|---|---|---|---|---|---|
| Ex. 1 | 5 | 3 | 2 | 1 | 8.4 | 1.3 | 0/0 | 8 |
| Ex. 2 | 5 | 3.8 | 1.4 | 1.1 | 6.2 | 1.1 | 0/0 | 6 |
| Ex. 3 | 5 | 2.25 | 2.21 | 1.1 | 11 | 1.5 | 0/0 | 14 |
| Comp. Ex. 1 | 5 | 3 | 2 | 0.5 | 12 | 1.3 | 0/1 | 5 |
| Comp. Ex. 2 | 5 | 4.44 | 1.33 | 0.6 | 18 | 2.0 | 0/0 | 14 |
| Comp. Ex. 3 | 5 | 1.35 | 2.21 | 0.6 | 4 | 1.0 | 0/1 | 0 |

What is claimed is:

1. A coating composition comprising

A) at least one silicon compound which has at least one radical that is bonded directly to Si, is not able to be separated hydrolytically and contains an epoxy group, and per mole of component A), B) 0.42 to 0.68 moles of a particulate material which is selected from the group consisting of oxides, oxide hydrates, nitrides and carbides of Si, Al, B and transition metals, and has a particle size of 1 to 100 nm, C) 0.36 to 0.90 moles of a Si, Ti, Zr, B, Sn or V compound, which is different than compound A) and corresponds to the formula $$R_xM^{4+}R'_{4-x}$$

or $$R_xM^{3+}R'_{3-x}$$

wherein
M$^{4+}$ represents Si$^{4+}$, Ti$^{4+}$, Zr$^{4+}$, Sn$^{4+}$,
M$^{3+}$ represents B$^{3+}$ or (VO)$^{3+}$,
R represents a hydrolyzable radical,
R' represents a non-hydrolyzable radical and
x is 1 to 4 in the case of quadrivalent metal atoms M and 1 to 3 in the case of trivalent metal atoms M and
D) 0.14 to 0.22 moles of at least one hydrolyzable Ti, Zr or Al compound corresponding to the formula $$M(R''')_n$$

wherein
M represents Ti, Zr or Al,
R''' represents the same or different hydrolyzable groups and
n is 4 when M is Ti or Zr and 3 when M is Al.

2. The composition according to claim 1 wherein
(A) is a compound corresponding to the formula $$R_3SiR'$$

wherein
R represents the same or different hydrolyzable groups and R' represents a glycidyl- or glycidyloxy-(C$_{1-20}$)-alkylene radical,
(B) is an oxide or oxide hydrate of aluminium,
(C) is a compound corresponding to the formula $$SiR_4$$

wherein R represents the same or different hydrolyzable groups, and
(D) is a compound corresponding to the formula $$AlR_3$$

wherein R represents the same or different hydrolyzable groups.

3. The composition according to claim 1 wherein
(A) is γ-glycidyloxypropyl trimethoxy silane,
(B) is a sol prepared from boehmite having a particle size of 1 to 100 nm,
(C) is tetraethoxysilane, and
(D) is Al(butoxyethanolate)$_3$.

4. The composition according to claim 1 which additionally comprises
E) a Lewis base and/or
F) at least one hydrolyzable silicon compound having at least one non-hydrolyzable radical which has 5 to 30 fluorine atoms bonded directly to carbon atoms which are separated from the Si by at least 2 atoms, and/or
G) a surfactant and/or
H) an aromatic polyol (H) having an average molecular weight not exceeding 1000.

5. A coated substrate coated with the coating composition of claim 1.

6. A coated substrate coated with the coating composition of claim 1 wherein the substrate is a lenses, spectacle glass or automotive window made of glass or plastics materials.

7. A process of preparing a composition containing
A) 1 mole of at least one silicon compound which has at least one radical that is bonded directly to Si, is not able to be separated hydrolytically and contains an epoxy group,
B) 0.42 to 0.68 moles of a particulate material which is selected from the group consisting of oxides, oxide hydrates, nitrides and carbides of Si, Al, B and transition metals, and has a particle size of 1 to 100 nm,
C) 0.36 to 0.90 moles of a Si, Ti, Zr, B, Sn or V compound, which is different from compound A) and corresponds to the formula $$R_xM^{4+}R'_{4-x}$$

or $$R_xM^{3+}R'_{3-x}$$

wherein
M$^{4+}$ represents Si$^{4+}$, Ti$^{4+}$, Zr$^{4+}$, Sn$^{4+}$,
M$^{3+}$ represents B$^{3+}$ or (VO)$^{3+}$,
R represents a hydrolyzable radical,
R' represents a non-hydrolyzable radical and
x is 1 to 4 in the case of quadrivalent metal atoms M and 1 to 3 in the case of trivalent metal atoms M and
D) 0.14 to 0.22 moles of at least one hydrolyzable Ti, Zr or Al compound corresponding to the formula $$M(R''')_n$$

wherein
M represents Ti, Zr or Al,
R''' represents the same or different hydrolyzable groups and
n is 4 when M is Ti or Zr and 3 when M is Al,
comprising reacting a sol of particulate material (B) having a pH of 2.5 to 3.5 with silicon compound (A).

8. The process according to claim 7 comprising the steps of
a) pre-mixing silicon compound (A) and compound (C),
b) subsequently adding from 10 to 70 wt. % of the total quantity of the sol of material (B) having a pH of 2.5 to 3.5,
c) subsequently adding compound (D), and
d) subsequently adding the remainder of the sol of material (B).

9. The process according to claim 8, wherein step b) is preformed at a temperature exceeding 25° C. and steps c) and d) are preformed at 0±2° C.

10. The process according to claim 7 which comprises pre-hydrolyzing compound (A) with an acid catalyst.

11. The process according to claim 7 which comprises using dilute hydrochloric acid to adjust the pH.

12. A process for coating a substrate comprising coating the substrate with a coating composition comprising
A) 1 mole of at least one silicon compound which has at least one radical that is bonded directly to Si, is not able to be separated hydrolytically and contains an epoxy group,
B) 0.42 to 0.68 moles of a particulate material which is selected from the group consisting of oxides, oxide hydrates, nitrides and carbides of Si, Al, B and transition metals, and has a particle size of 1 to 100 nm, C) 0.36 to 0.90 moles of a Si, Ti, Zr, B, Sn or V compound, which is different from compound A) and corresponds to the formula $$R_xM^{4+}R'_{4-x}$$

or $$R_xM^{3+}R'_{3-x}$$

wherein
$M^{4+}$ represents $Si^{4+}$, $Ti^{4+}$, $Zr^{4+}$, $Sn^{4+}$,
$M^{3+}$ represents $B^{3+}$ or $(VO)^{3+}$,
R represents a hydrolyzable radical,
R' represents a non-hydrolyzable radical and
x is 1 to 4 in the case of quadrivalent metal atoms M and 1 to 3 in the case of trivalent metal atoms M and D) 0.14 to 0.22 moles of at least one hydrolyzable Ti, Zr or Al compound corresponding to the formula $$M(R''')_n$$

wherein
M represents Ti, Zr or Al,
R''' represents the same or different hydrolyzable groups and
n is 4 when M is Ti or Zr and 3 when M is Al.

13. The process according to claim 12 comprises adding an inert solvent to the coating composition before it is applied to the substrate.

14. The process according to claim 12 which comprises adding a solvent selected from the group of $C_1$–$C_8$ alcohols and/or monoalkyl glycol ethers to the coating composition before it is applied to the substrate.

15. The process according to claim 12 which comprises a) curing the coating composition at a temperature of 90 to 180° C. or b) curing the coating composition photochemically after the addition of a photoinitiator and optionally post-curing in a thermal manner.

* * * * *